US012500525B2

(12) United States Patent
Nishizawa

(10) Patent No.: US 12,500,525 B2
(45) Date of Patent: Dec. 16, 2025

(54) POWER CONVERSION DEVICE

(71) Applicant: HITACHI ASTEMO, LTD., Hitachinaka (JP)

(72) Inventor: Youhei Nishizawa, Hitachinaka (JP)

(73) Assignee: HITACHI ASTEMO, LTD., Hitachinaka (JP)

(*) Notice: Subject to any disclaimer, the term of this patent is extended or adjusted under 35 U.S.C. 154(b) by 209 days.

(21) Appl. No.: 18/563,035

(22) PCT Filed: Sep. 10, 2021

(86) PCT No.: PCT/JP2021/033422
§ 371 (c)(1),
(2) Date: Nov. 21, 2023

(87) PCT Pub. No.: WO2023/037523
PCT Pub. Date: Mar. 16, 2023

(65) Prior Publication Data
US 2024/0213886 A1  Jun. 27, 2024

(51) Int. Cl.
H02M 7/00 (2006.01)
H02M 1/14 (2006.01)
H02M 7/5387 (2007.01)

(52) U.S. Cl.
CPC .......... *H02M 7/003* (2013.01); *H02M 1/143* (2013.01); *H02M 7/5387* (2013.01)

(58) Field of Classification Search
CPC ..... H02M 7/003; H02M 1/143; H02M 7/5387
See application file for complete search history.

(56) References Cited

U.S. PATENT DOCUMENTS 10,673,349 B2\* 6/2020 Nishizawa ......... H05K 7/14329
2018/0358903 A1 12/2018 Takahashi et al.
(Continued)

FOREIGN PATENT DOCUMENTS

JP 6328298 B1 5/2018
JP 2018-207718 A 12/2018
(Continued)

OTHER PUBLICATIONS

International Search Report with English Translation and Written Opinion dated Nov. 2, 2021 in corresponding International Patent Application No. PCT/JP2021/033422 (8 pages).

*Primary Examiner* — Adolf D Berhane
(74) *Attorney, Agent, or Firm* — Foley & Lardner LLP

(57) ABSTRACT

A power conversion device includes: a power conversion circuit that converts DC power into AC power; a positive electrode bus bar and a negative electrode bus bar connected to the power conversion circuit; a capacitor connected to at least one of the positive electrode bus bar and the negative electrode bus bar; a base plate made of metal on which the capacitor is placed; and a housing in which the power conversion circuit, the capacitor, the base plate, the positive electrode bus bar, and the negative electrode bus bar are accommodated, and a refrigerant passage is formed, in which the positive electrode bus bar and the negative electrode bus bar are installed in the housing via a resin member having insulating property, and in which the base plate on which the capacitor is placed is installed in the housing, and a thermal resistance from the capacitor to the refrigerant passage is larger than a thermal resistance from the positive electrode bus bar and the negative electrode bus bar to the refrigerant passage.

11 Claims, 12 Drawing Sheets

(56) References Cited

U.S. PATENT DOCUMENTS

2020/0100377 A1   3/2020   Nishizawa et al.
2020/0350829 A1   11/2020  Hamaguchi et al.

FOREIGN PATENT DOCUMENTS

WO   WO-2018/116667 A1   6/2018
WO   WO-2019/087852 A1   5/2019

* cited by examiner

FIG. 8
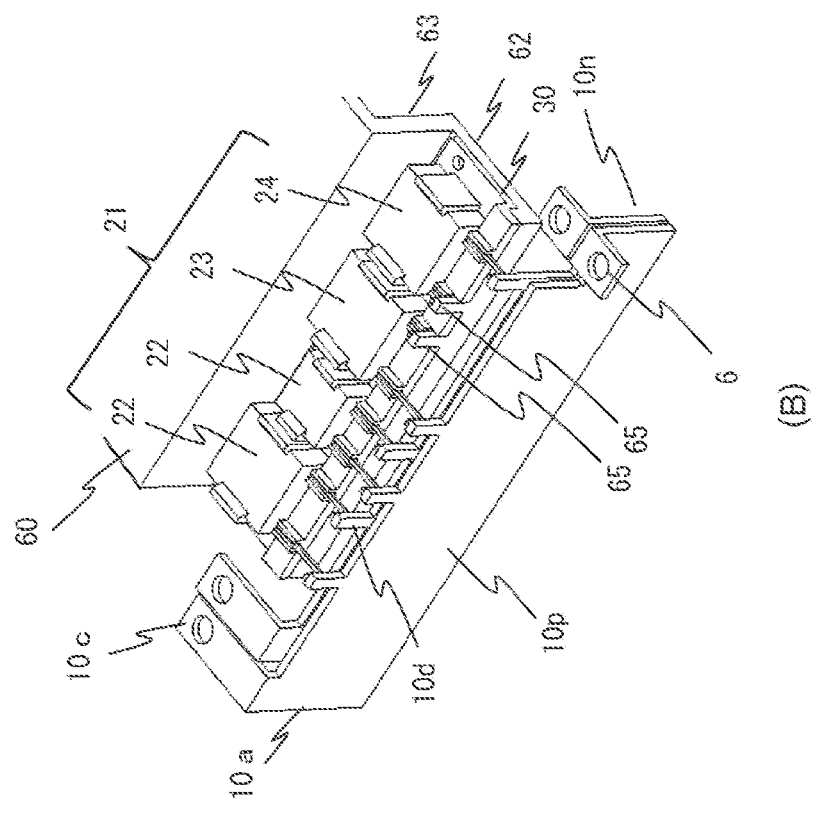
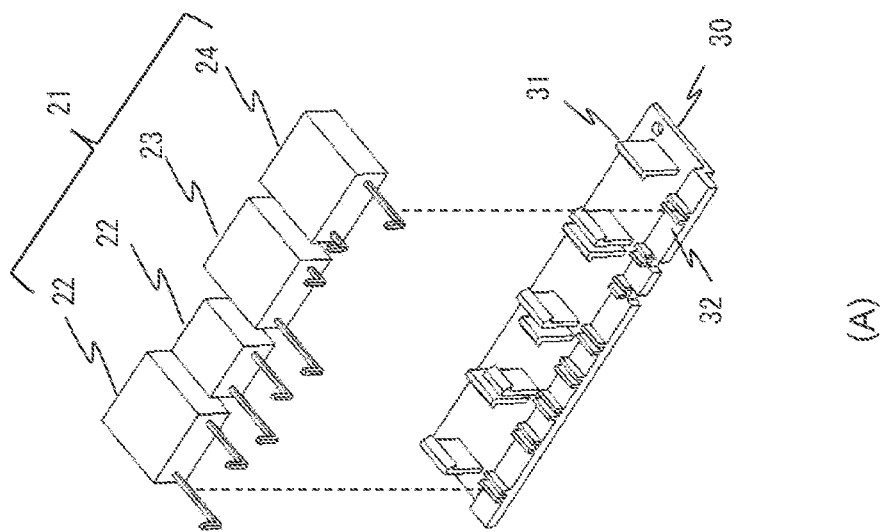

FIG. 9
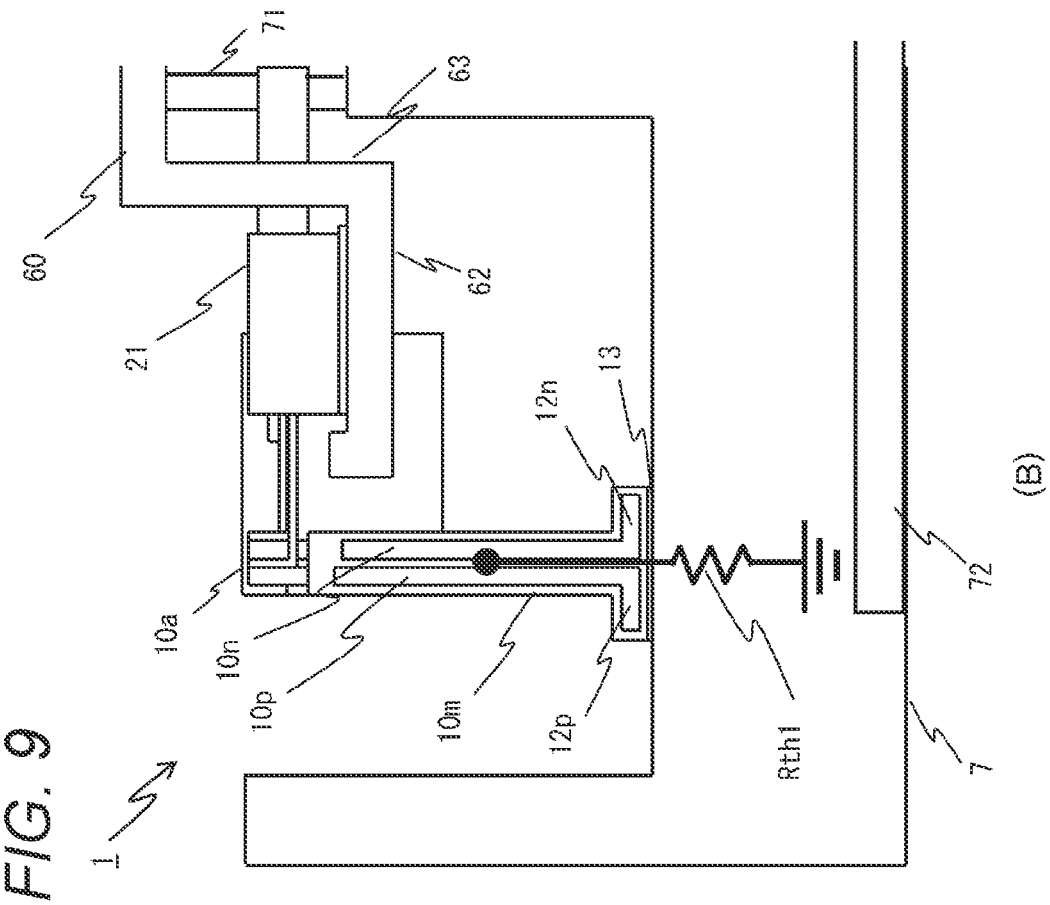
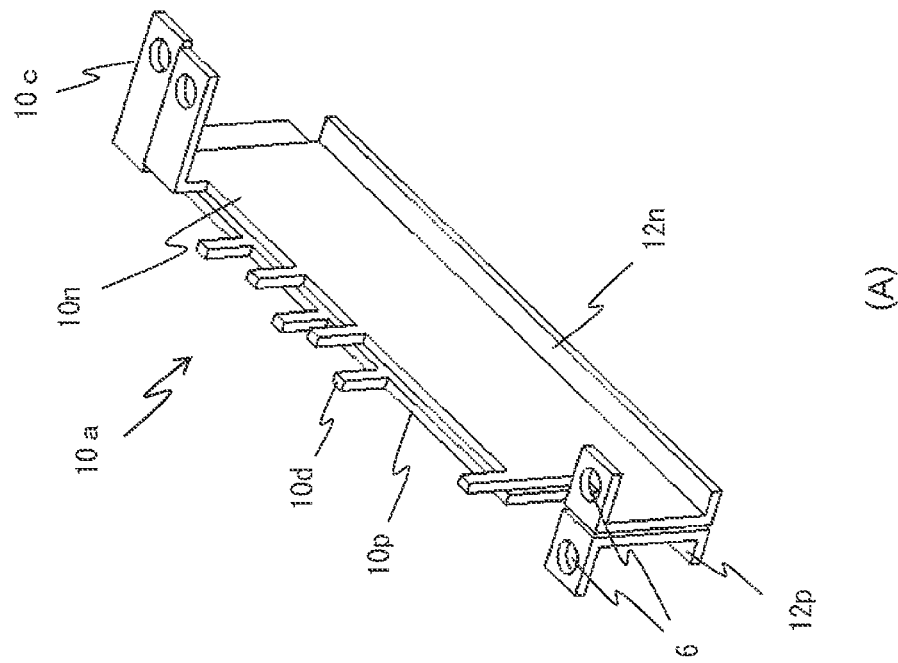

FIG. 10
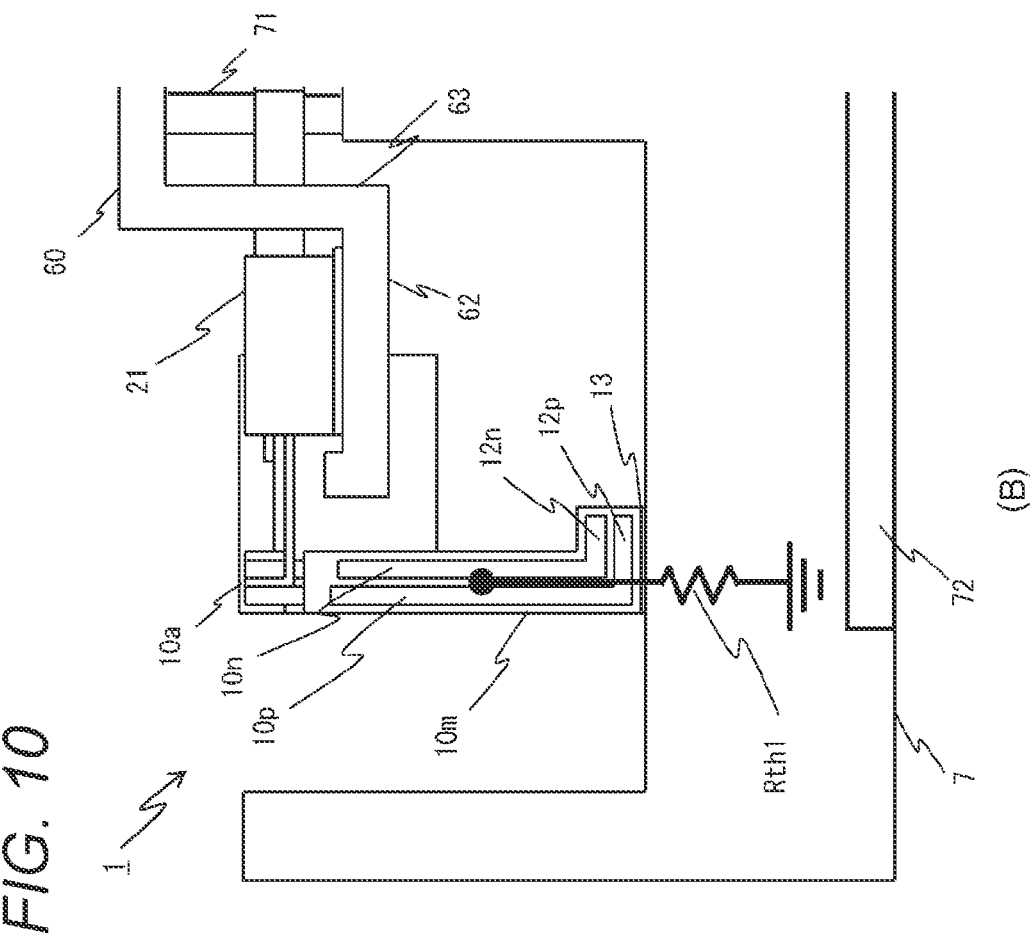
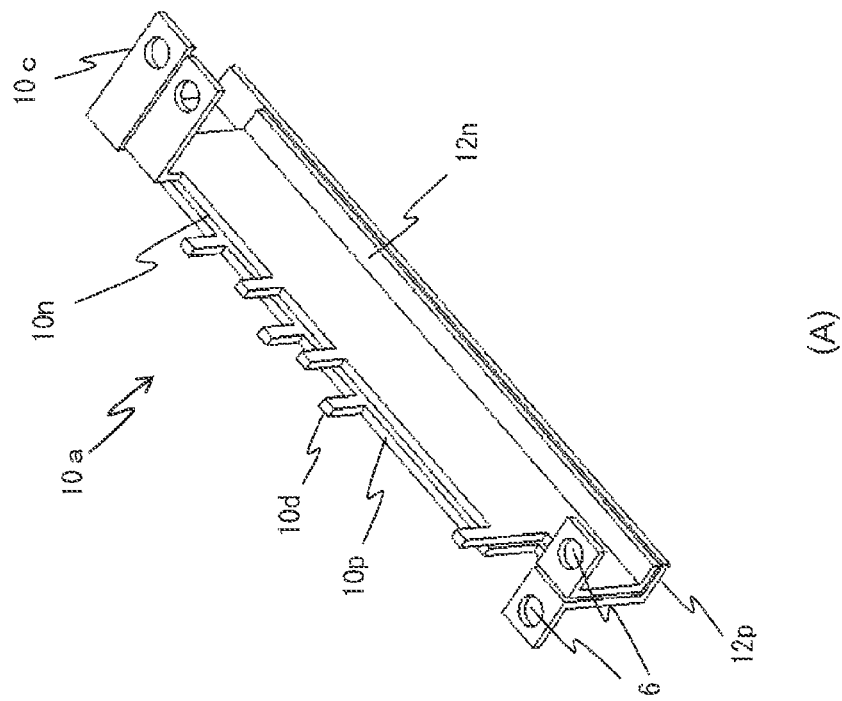

FIG. 12
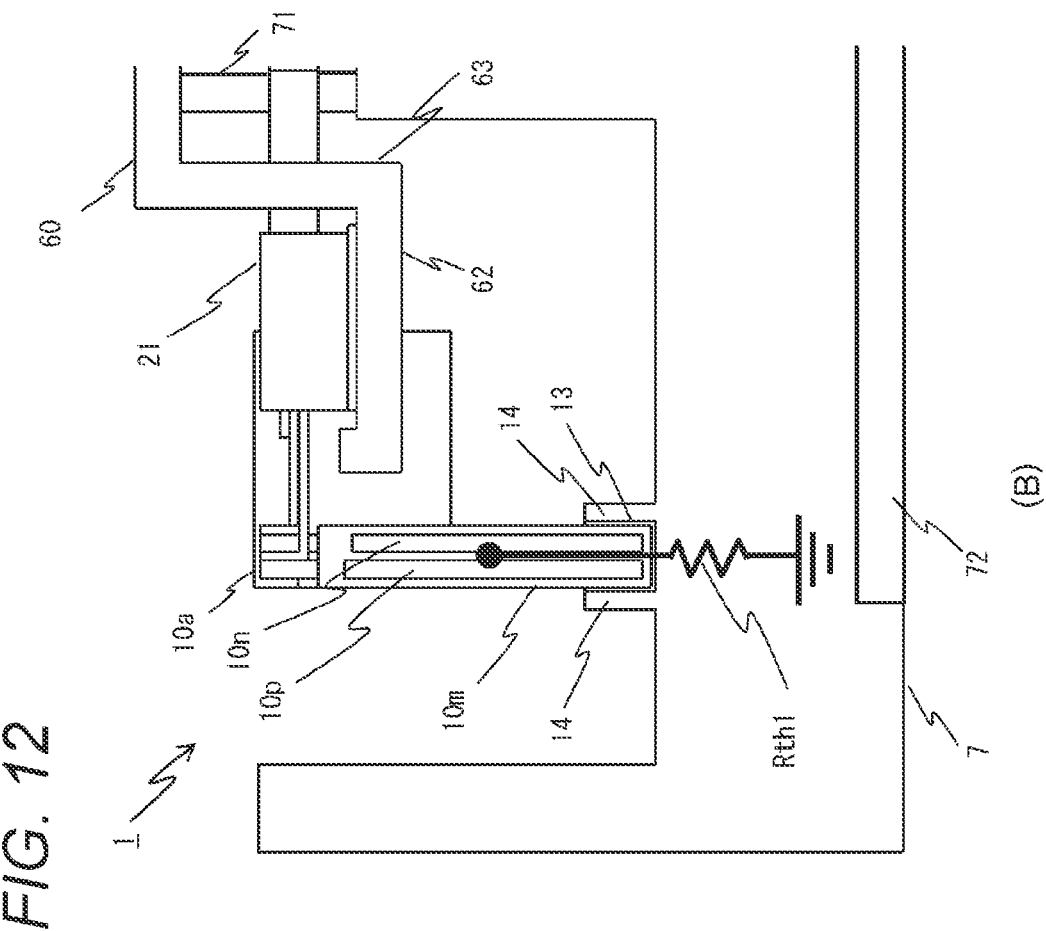
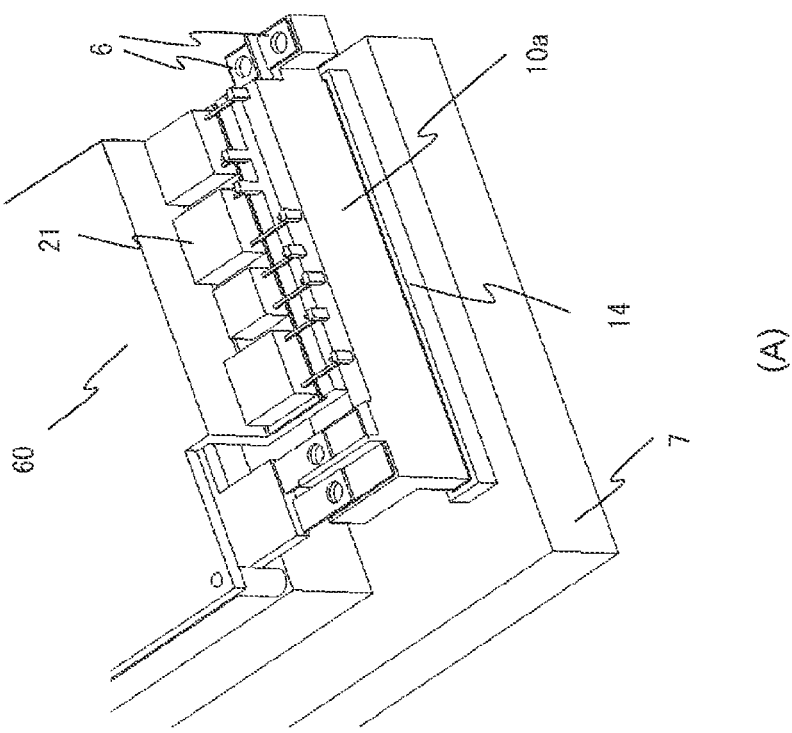

POWER CONVERSION DEVICE

TECHNICAL FIELD

The present invention relates to a power conversion device.

BACKGROUND ART

In a power conversion device including a power conversion circuit that converts DC power into AC power, bus bars forming positive and negative electrode wirings are routed. As the power conversion device increases in output and current, heat generated in the bus bars, which are power transmission paths at the time of power conversion, increases. For this reason, a capacitor installed in the power conversion device for the purpose of noise removal or the like is easily affected by heat generation of the bus bar, and an efficient cooling structure is required.

PTL 1 describes a power conversion device in which a noise filter unit having a capacitor is connected to a conductor portion forming a power path, and the conductor portion is arranged in a space between a cooling surface of a cooling unit and the noise filter unit.

CITATION LIST

Patent Literature

PTL 1: WO 2018/116667 A

SUMMARY OF INVENTION

Technical Problem

In the power conversion device described in Patent Literature 1, the capacitor is affected by heat generation of the bus bar.

Solution to Problem

A power conversion device according to the present invention includes: a power conversion circuit that converts DC power into AC power; a positive electrode bus bar and a negative electrode bus bar connected to the power conversion circuit; a capacitor connected to at least one of the positive electrode bus bar and the negative electrode bus bar; a base plate made of metal on which the capacitor is placed; and a housing in which the power conversion circuit, the capacitor, the base plate, the positive electrode bus bar, and the negative electrode bus bar are accommodated, and a refrigerant passage is formed, in which the positive electrode bus bar and the negative electrode bus bar are installed in the housing via a resin member having insulating property, and in which the base plate on which the capacitor is placed is installed in the housing, and a thermal resistance from the capacitor to the refrigerant passage is larger than a thermal resistance from the positive electrode bus bar and the negative electrode bus bar to the refrigerant passage.

Advantageous Effects of Invention

According to the present invention, the capacitor is less likely to be affected by heat generated by the bus bar.

BRIEF DESCRIPTION OF DRAWINGS

FIG. 8(A) and FIG. 8(B) are perspective views of a noise removing capacitor.

FIG. 9(A) and FIG. 9(B) are perspective views illustrating Modification 1 of a first DC bus bar.

FIG. 10(A) and FIG. 10(B) are perspective views illustrating Modification 2 of the first DC bus bar.

FIG. 12(A) and FIG. 12(B) are views illustrating Modification 4 of the power conversion device 1.

DESCRIPTION OF EMBODIMENTS

Figure 1:
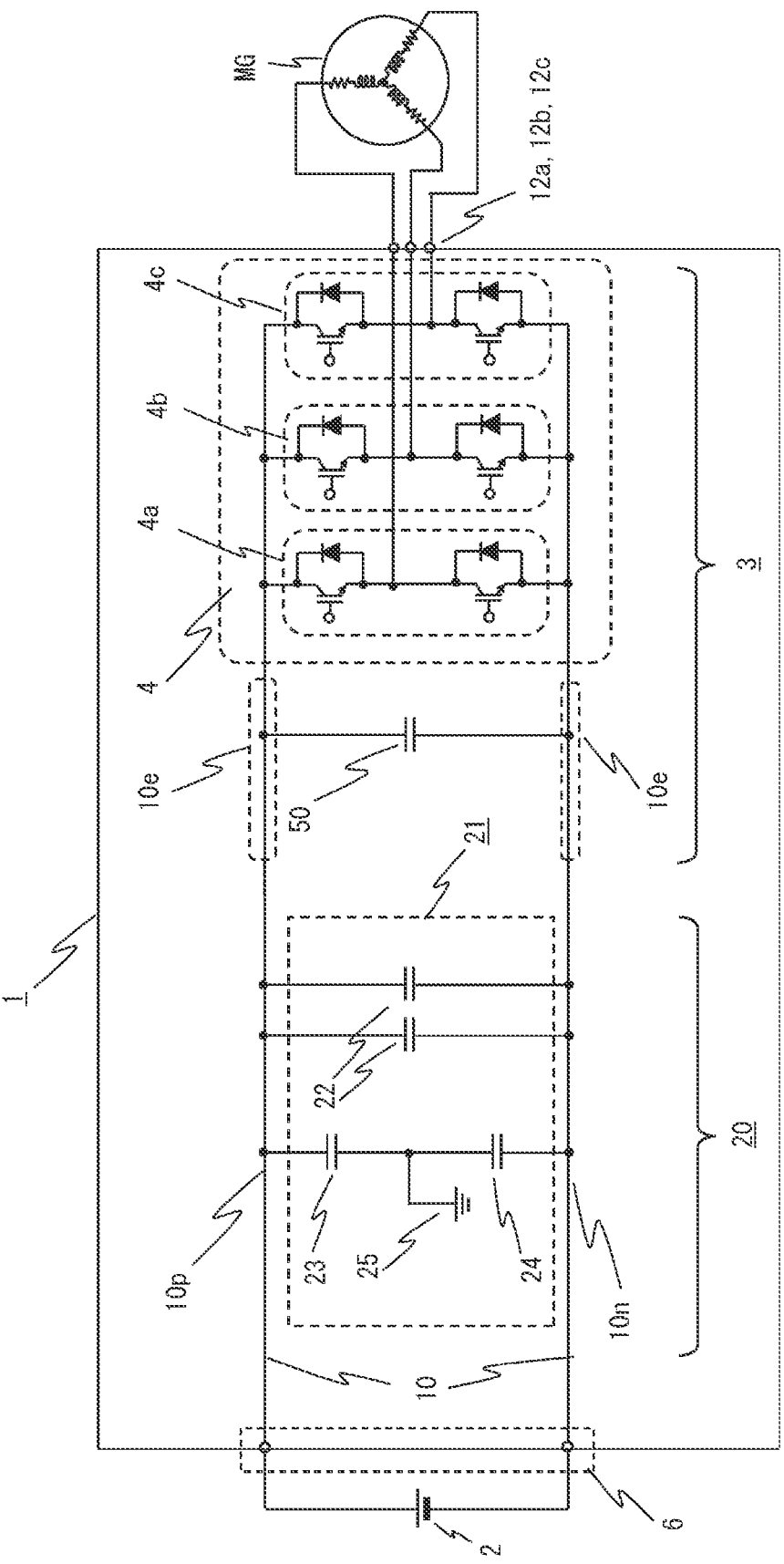
FIG. 1 is a circuit configuration diagram of a power conversion device.

Hereinafter, an embodiment of the present invention will be described with reference to the drawings. The following description and drawings are omitted and simplified as appropriate for clarity of description in the examples for describing the present invention. The present invention can also be carried out in various other forms. Unless otherwise specified, each component may be singular or plural.

Positions, sizes, shapes, ranges, and the like of the components illustrated in the drawings may not represent actual positions, sizes, shapes, ranges, and the like in order to facilitate understanding of the invention. Therefore, the present invention is not necessarily limited to the position, size, shape, range, and the like disclosed in the drawings.

In a case where there is a plurality of components having the same or similar functions, the same reference numerals may be attached with different subscripts for description. However, in a case where it is not necessary to distinguish the plurality of components, the description may be made while omitting the subscript.

FIG. 1 is a circuit configuration diagram of a power conversion device 1.

The power conversion device 1 converts DC power from a high-voltage battery 2, which is a DC power supply, into AC power, and drives a motor generator MG with the converted AC power. The motor generator MG is used, for example, as a driving force of a hybrid vehicle or an electric vehicle. When the motor generator MG is rotated by an external force, the motor generator MG functions as a generator, and regenerates the generated AC power to the high-voltage battery 2.

The power conversion device 1 includes a filter circuit unit 20 and a power conversion circuit 3.

The filter circuit unit 20 is provided between DC power supply terminals 6 and the power conversion circuit 3, and is a circuit for suppressing electromagnetic noise generated when the power conversion circuit 3 performs a power conversion operation. The filter circuit unit 20 includes a noise removing capacitor 21, and the noise removing capacitor 21 includes an X capacitor 22 and Y capacitors 23 and 24.

A DC bus bar 10 is connected to the high-voltage battery 2 and the power conversion circuit 3, and includes a positive electrode bus bar 10p and a negative electrode bus bar 10n.

The noise removing capacitor 21 is connected to at least one of the positive electrode bus bar 10p and the negative electrode bus bar 10n.

The X capacitor 22 is connected between the positive electrode bus bar 10p and the negative electrode bus bar 10n, and smooths power having a frequency higher than a frequency of power smoothed by the smoothing capacitor 50. The Y capacitor 23 is connected between the positive electrode bus bar 10p and a GND terminal 25 to remove common mode noise. A Y capacitor 24 is connected between the negative electrode bus bar 10n and the GND terminal 25, and removes common mode noise.

The power conversion circuit 3 includes the smoothing capacitor 50 for smoothing DC power and a power semiconductor circuit unit 4.

The smoothing capacitor 50 is arranged between the filter circuit unit 20 and the power semiconductor circuit unit 4, and is connected in a connection region 10e between the positive electrode bus bar 10p and the negative electrode bus bar 10n.

The power semiconductor circuit unit 4 includes a U-phase power semiconductor module 4a, a V-phase power semiconductor module 4b, and a W-phase power semiconductor module 4c.

The power semiconductor modules 4a, 4b, and 4c of the respective phases constitute upper and lower arm series circuits including switching elements. A diode element is connected in parallel with each switching element, and the diode element has a function of returning a current from the motor generator MG and converting AC power into DC power during regeneration. AC bus bars 12a, 12b, and 12c derived from intermediate connection points of the upper and lower arm series circuits of the power semiconductor modules 4a, 4b, and 4c of the respective phases are connected to windings of the respective phases of the motor generator MG.

Figure 2:
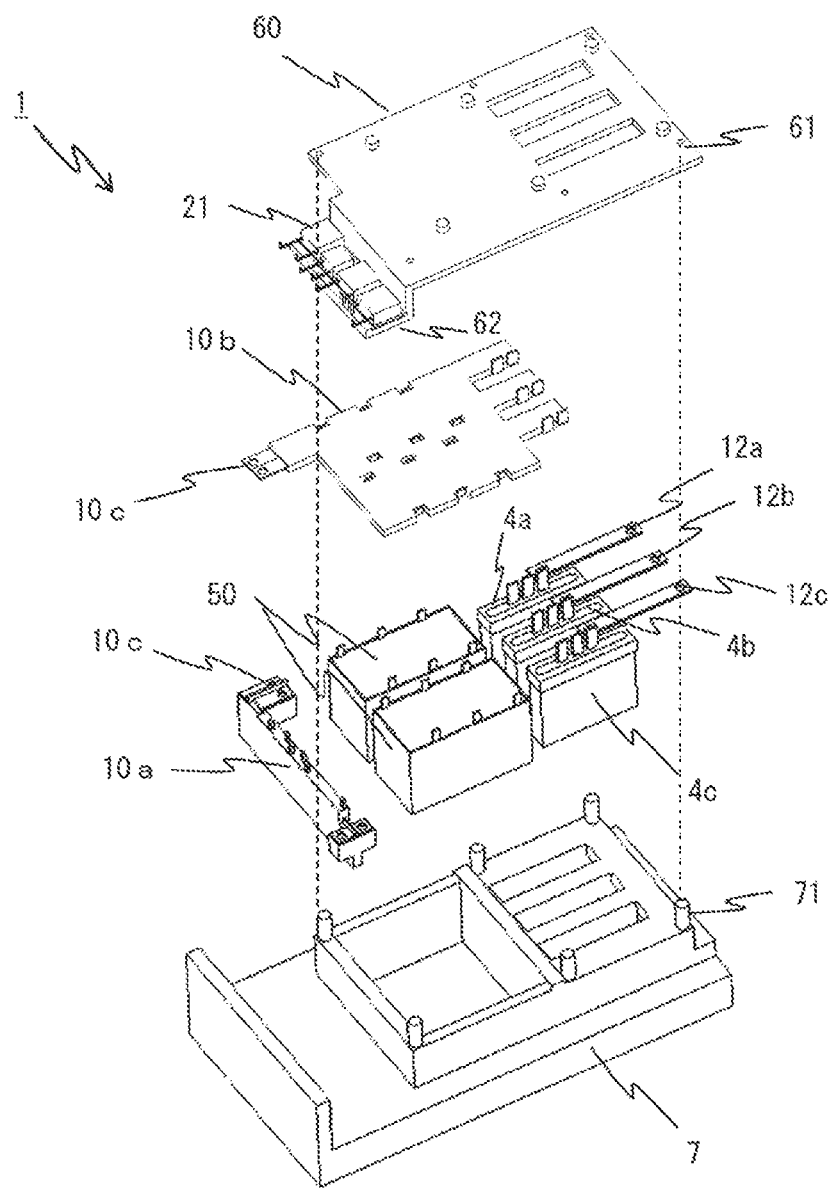
FIG. 2 is an exploded perspective view of the power conversion device.

FIG. 2 is an exploded perspective view of the power conversion device 1.

A housing 7 accommodates components of the filter circuit unit 20 and the power conversion circuit 3. The housing 7 is made of metal such as aluminum, and is a material having high thermal conductivity.

The DC bus bar 10 is formed by connecting a first DC bus bar 10a and a second DC bus bar 10b by a connection portion 10c. The first DC bus bar 10a, the smoothing capacitor 50, and the power semiconductor modules 4a, 4b, and 4c are arranged on an inner bottom surface of the housing 7. The second DC bus bar 10b is arranged thereon. The second DC bus bar 10b is connected to the first DC bus bar 10a at the connection portion 10c, and the second DC bus bar 10b is electrically connected to the smoothing capacitor 50 and DC input terminals of the power semiconductor modules 4a, 4b, and 4c. AC bus bars 12a, 12b, and 12c are connected to AC output terminals of the power semiconductor modules 4a, 4b, and 4c.

A base plate 60 is arranged on the second DC bus bar 10b. The base plate 60 is made of metal such as aluminum, and is a plate material having high thermal conductivity. The housing 7 includes six columnar convex portions 71 protruding toward the base plate 60, and the base plate 60 includes six fixing portions 61 fixed on the top surfaces of the convex portions 71. At the fixing portions 61, the base plate 60 is fixed to the housing 7 by screwing or the like.

The noise removing capacitor 21 is placed on a mounting portion 62 of the base plate 60 via an insulating member, a heat dissipation member, or the like. The noise removing capacitor 21 is electrically connected to the first DC bus bar 10a by welding, soldering, or the like. Although an example in which the noise removing capacitor 21 is mounted on the mounting portion 62 will be described, other types of capacitors may be mounted.

On the base plate 60, although not illustrated in FIG. 2, a circuit board 70 (see FIG. 3) is fixed to the base plate 60.

The housing 7 accommodates components of the filter circuit unit 20 and the power conversion circuit 3 in a sealed state with an upper lid, a side plate, or the like (not illustrated). Similarly to the housing 7, the upper lid, the side plate, and the like are also made of metal such as aluminum, and are materials having high thermal conductivity.

Figure 3:
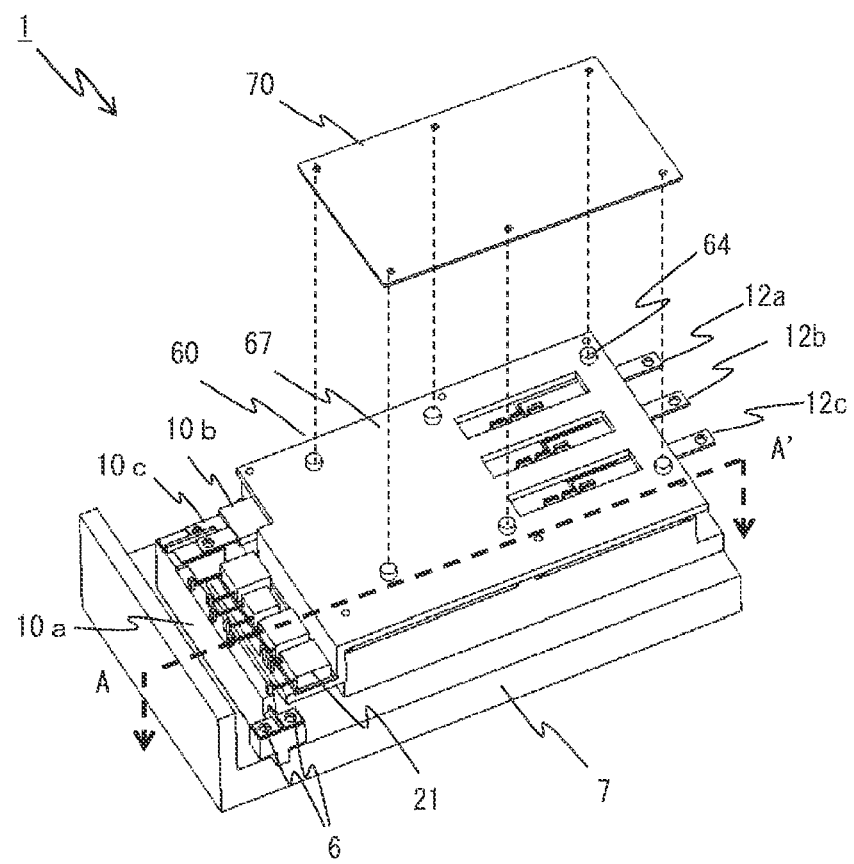
FIG. 3 is a perspective view of the power conversion device.

FIG. 3 is a perspective view of the power conversion device 1. A state in which components of the filter circuit unit 20 and the power conversion circuit 3 are accommodated and a circuit board 70 are illustrated.

Electronic components constituting a drive circuit for driving the power semiconductor modules 4a, 4b, and 4c, a control circuit for controlling the drive circuit in response to a command from a host system, and the like are mounted on the circuit board 70. Six columnar convex portions 64 protruding toward the circuit board 70 are formed on a horizontal surface 67 of the base plate 60, and the circuit board 70 is fixed to the base plate 60 by screwing or the like on the top surfaces of the convex portions 64. That is, the circuit board 70 is fixed in a state of being arranged to face the surface (horizontal surface 67) opposite to a surface on which the second DC bus bar 10b and the smoothing capacitor 50 are arranged (a surface of the second DC bus bar 10b facing the connection region 10e described later), of the two main surfaces of the base plate 60.

Figure 4:
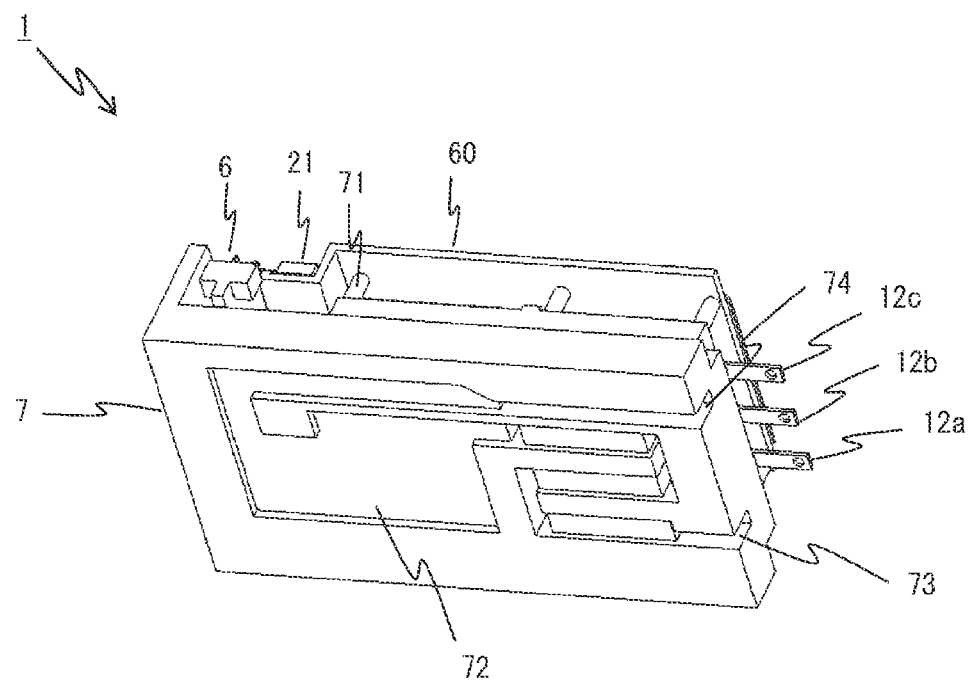
FIG. 4 is a perspective view of the power conversion device as viewed from the bottom.

FIG. 4 is a perspective view of the power conversion device 1 as viewed from the bottom.

A refrigerant passage 72 is formed on the bottom surface of the housing 7. In the refrigerant passage 72, the refrigerant flowing in from an inlet 73 passes through the refrigerant passage 72 and flows out from an outlet 74. Although not illustrated, a closing plate is provided on the bottom surface of the housing 7 forming the refrigerant passage 72 to prevent the refrigerant from leaking from the refrigerant passage 72 excluding the inlet 73 and the outlet 74. The refrigerant circulates in the refrigerant passage 72 by the action of a pump (not illustrated) or the like provided outside. As a result, the housing 7 is cooled, and the heat generated from a heat source in the housing 7 is conducted to the housing 7 and cooled.

Figure 5:
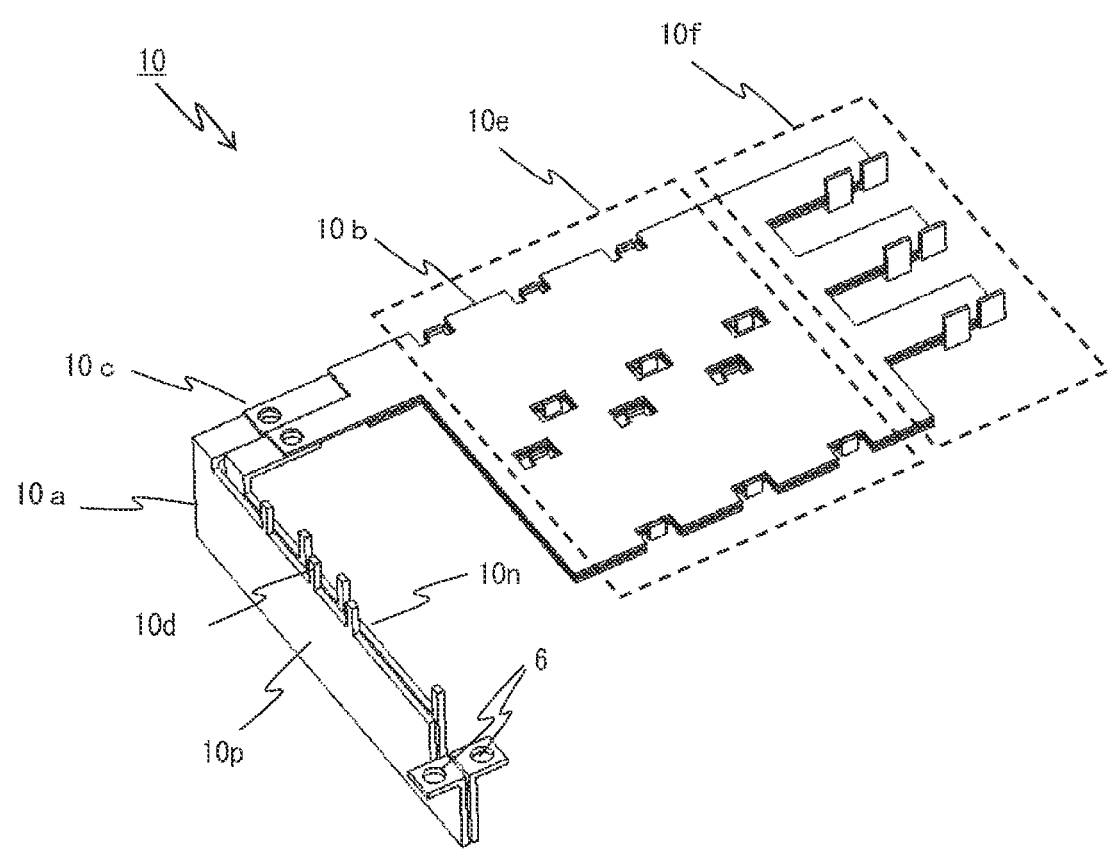
FIG. 5 is a perspective view of a DC bus bar.

FIG. 5 is a perspective view of the DC bus bar 10.

The DC bus bar 10 is formed by connecting the first DC bus bar 10a and the second DC bus bar 10b by the connection portion 10c. The first DC bus bar 10a and the second DC bus bar 10b are constituted by the positive electrode bus bar 10p and the negative electrode bus bar 10n, respectively, and the positive electrode bus bar 10p and the negative electrode bus bar 10n are covered with an insulating resin member 10m, respectively, and are provided by being stacked in an insulated state from each other. In FIG. 5, the resin member 10m is removed for easy understanding.

Ends of the positive electrode bus bar 10p and the negative electrode bus bar 10n of the first DC bus bar 10a form positive and negative DC power supply terminals 6. A connection terminal 10d for connection with the noise removing capacitor 21 is formed on the positive electrode bus bar 10p and the negative electrode bus bar 10n of the first DC bus bar 10a.

The second DC bus bar 10b has the connection region 10e connected to the smoothing capacitor 50 and a connection region 10f connected to the power semiconductor modules 4a, 4b, and 4c. In the connection region 10e, the positive electrode bus bar 10p and the negative electrode bus bar 10n of the second DC bus bar 10b, and the positive and negative electrode terminals of the smoothing capacitor 50 are connected. In the connection region 10f, the positive electrode bus bar 10p and the negative electrode bus bar 10n of the second DC bus bar 10b are connected to the positive and negative electrode terminals of the power semiconductor modules 4a, 4b, and 4c.

Figure 6:
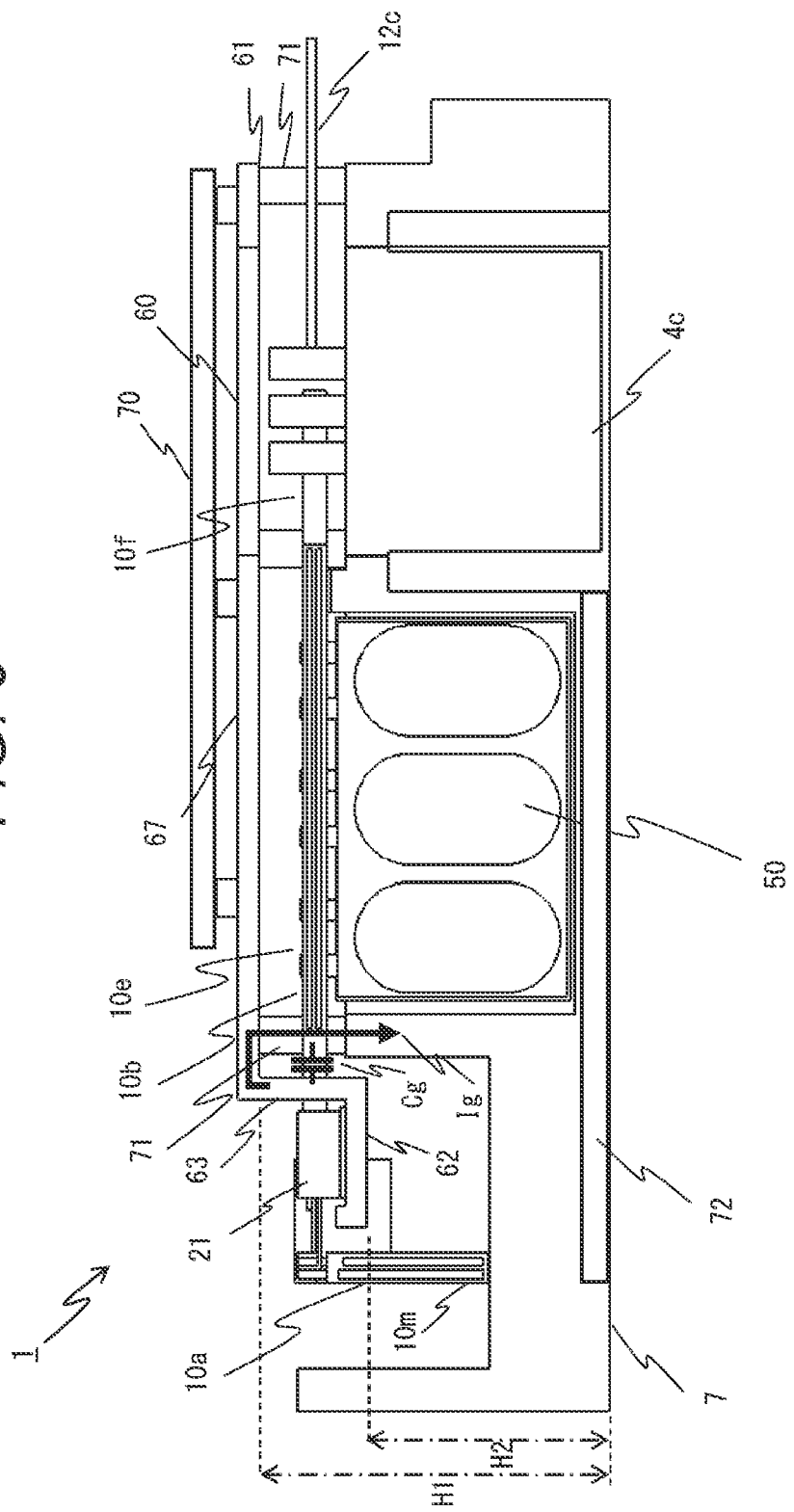
FIG. 6 is a cross-sectional view of the power conversion device.

FIG. 6 is a cross-sectional view of the power conversion device 1. FIG. 3 illustrates a cross section taken along line A-A' of FIG. 3. The same portions as those in FIGS. 2 to 5 are denoted by the same reference numerals, and the description thereof will be simplified.

The first DC bus bar 10a is fixed to the housing 7 via the insulating resin member 10m which is a covering member thereof. The noise removing capacitor 21 connected to the first DC bus bar 10a is placed on the mounting portion 62 of the base plate 60.

The base plate 60 is fixed onto the top surfaces of the convex portions 71 of the housing 7 by screwing or the like, and the horizontal surface 67 of the base plate 60 is arranged at a position spaced apart from a connection region 11e, the smoothing capacitor 50, the power semiconductor modules 4a, 4b, and 4c, and the second DC bus bar 10b. That is, the connection regions 10e and 10f of the second DC bus bar 10b are arranged between the base plate 60 and the housing 7.

The base plate 60 is bent toward the bottom surface of the housing 7 between the first DC bus bar 10a and the second DC bus bar 10b to form a wall portion 63. That is, the base plate 60 forms the wall portion 63 between the connection region 10e and the mounting portion 62. Further, the base plate 60 is bent such that the lower end of the wall portion 63 is parallel to the horizontal surface 67 of the base plate 60 to form the mounting portion 62.

The height of the fixing portion 61 of the base plate 60 from the bottom surface of the housing 7 is H1. The height of the mounting portion 62 from the bottom surface of the housing 7 is H2. The position of the fixing portion 61 of the base plate 60 (the position of the horizontal surface 67 of the base plate 60) is higher than the position of the mounting portion 62.

A stray capacitance Cg is formed between the wall portion 63 of the base plate 60 and the connection region 10e between the second DC bus bar 10b and the smoothing capacitor 50. The stray capacitance Cg allows a noise current Ig generated by a voltage change due to the operation of the switching elements in the power semiconductor modules 4a, 4b, and 4c to flow to the housing 7. The noise current Ig flows from the wall portion 63 of the base plate 60 to the housing 7 via the convex portions 71. As a result, it is possible to prevent noise inside the power conversion device 1 from flowing out to the outside of the power conversion device 1 from the first DC bus bar 10a.

Figure 7:
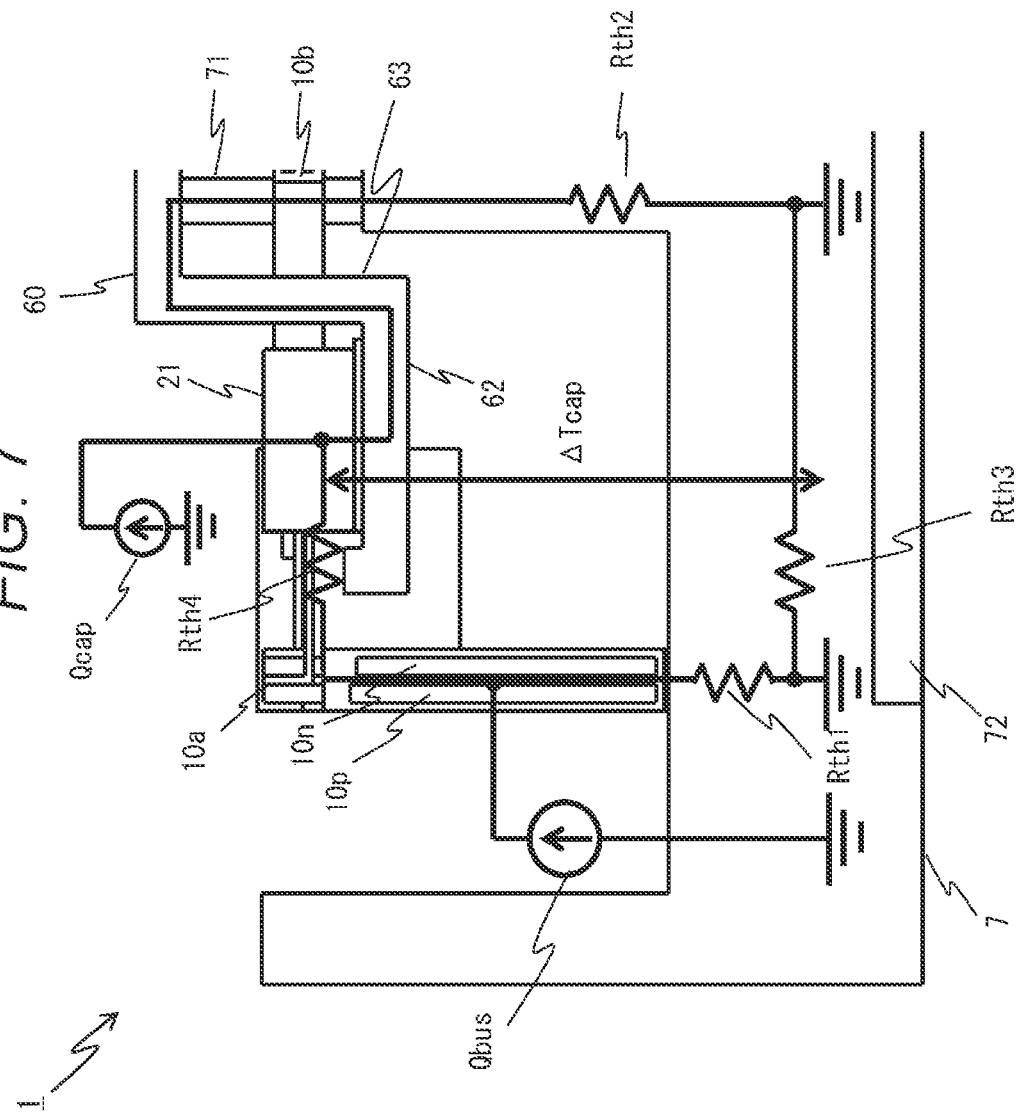
FIG. 7 is a partially enlarged view of a cross-sectional view of the power conversion device.

FIG. 7 is a partially enlarged view of a cross-sectional view of the power conversion device 1. FIG. 7 is an enlarged view of the vicinity of the noise removing capacitor 21 of FIG. 6. Further, a thermal equivalent circuit is schematically illustrated in FIG. 7. The same portions as those in FIG. 6 are denoted by the same reference numerals, and the description thereof will be simplified.

When the power conversion circuit 3 converts the DC power into the AC power, in the heat generation Qbus of the first DC bus bar 10a, the DC current flows, and heat is generated due to the power loss. In the heat generation Qcap of the noise removing capacitor 21, a noise component in the current flowing through the first DC bus bar 10a flows, and heat is generated due to the power loss. The heat generation Qcap is smaller than the heat generation Qbus. The temperature rise ΔTcap is a temperature rise of the noise removing capacitor 21.

The first DC bus bar 10a is fixed to the housing 7, and a portion from the positive electrode bus bar 10p and the negative electrode bus bar 10n of the first DC bus bar 10a to the refrigerant passage 72 is a thermal resistance Rth1. The noise removing capacitor 21 is mounted on the mounting portion 62 of the base plate 60, and the base plate 60 is fixed to the housing 7 by the convex portions 71. A portion from the noise removing capacitor 21 to the refrigerant passage 72 is a thermal resistance Rth2. The thermal resistance Rth2 up to the noise removing capacitor 21 is arranged so as to be larger than the thermal resistance Rth1. That is, since the noise removing capacitor 21 is mounted on the mounting portion 62 of the base plate 60, the thermal resistance Rth2 from the noise removing capacitor 21 to the refrigerant passage 72 is larger than the thermal resistance Rth1 from the first DC bus bar 10a to the refrigerant passage 72.

A thermal resistance Rth3 is a thermal resistance in the housing 7 between the thermal resistance Rth1 and the thermal resistance Rth2. The thermal resistance Rth4 is a thermal resistance from the first DC bus bar 10a to the noise removing capacitor 21 at a connection portion between the first DC bus bar 10a and the noise removing capacitor 21.

In the present embodiment, the noise removing capacitor 21 is mounted on the mounting portion 62 of the base plate 60, and the base plate 60 is fixed to the housing 7, so that the thermal resistance Rth2 is larger than the thermal resistance Rth1. Furthermore, the base plate 60 is fixed to the housing 7 via the convex portions 71, so that the thermal resistance Rth2 is further increased by passing through the convex portions 71 having a small cross-sectional area. Furthermore, by forming the wall portion 63 on the base plate 60, the distance from the noise removing capacitor 21 to the convex portions 71 is increased, and the thermal resistance Rth2 is increased. In addition, by making the height H1 of the fixing portion 61 of the base plate 60 higher than the height H2 of the mounting portion 62, the distance from the noise removing capacitor 21 to the convex portions 71 is increased, and the thermal resistance Rth2 is increased. The distance from the noise removing capacitor 21 to the convex portions 71 may be increased by making the height H1 of the fixing portion 61 of the base plate 60 different from the height H2 of the mounting portion 62.

In this way, by making the thermal resistance Rth2 larger than the thermal resistance Rth1, the heat generation Qbus is mainly transferred to the refrigerant passage 72 via the thermal resistance Rth1. That is, the heat generation Qbus is prevented from flowing into the noise removing capacitor 21 via the thermal resistance Rth1, the thermal resistance Rth3, and the thermal resistance Rth2, and the temperature rise ΔTcap is prevented from increasing.

As the power conversion device 1 increases in output and current, heat generated in the DC bus bar 10, which is a power transmission path at the time of power conversion, increases. In addition, as the frequency of the switching elements in the power conversion device 1 is increased, the noise removing capacitor 21 for suppressing noise due to the high frequency needs to be arranged near the DC bus bar 10. In the present embodiment, the above-described configuration makes the noise removing capacitor 21 less susceptible to heat generation of the DC bus bar 10.

FIG. 8(A) and FIG. 8(B) are perspective views of the noise removing capacitor 21. FIG. 8(A) illustrates a state before the noise removing capacitor 21 is arranged, and FIG. 8(B) illustrates a state after the noise removing capacitor 21 is arranged.

As illustrated in FIG. 8(A), the positioning member 30 is formed of an insulating resin member in which the noise removing capacitors 21 are arranged in a line. In the positioning member 30, an elastic locking member 31 that sandwiches and locks each noise removing capacitor 21 from both sides and a holding member 32 that holds a terminal of each noise removing capacitor 21 are formed in accordance with the number and size of the noise removing capacitors 21. The elastic locking member 31 is an elastic member having a locking portion at the tip, sandwiches and locks the noise removing capacitor 21, which is mounted by being pushed from above, from both sides, and fixes the noise removing capacitor 21 after mounting. The holding member 32 facilitates positioning when the terminal of the noise removing capacitor 21 is connected to the first DC bus bar 10a, and insulates the terminal of the noise removing capacitor 21 from the base plate 60.

As illustrated in FIG. 8(B), the positioning member 30 to which the noise removing capacitor 21 is mounted is fixed to the mounting portion 62 of the base plate 60 by screwing or the like. The terminal of the noise removing capacitor 21 is connected to the positive electrode bus bar 10p of the first DC bus bar 10a, the connection terminal 10d of the negative electrode bus bar 10n, or the base plate 60. The base plate 60 is connected to the GND side.

As described with reference to FIG. 1, the noise removing capacitor 21 includes two X capacitors 22, one Y capacitor 23, and one Y capacitor 24. The X capacitor 22 is connected between the connection terminal 10d of the positive electrode bus bar 10p and the connection terminal 10d of the negative electrode bus bar 10n. The Y capacitor 23 is connected to the connection terminal 10d of the positive electrode bus bar 10p and a terminal 65 of the base plate 60. The Y capacitor 24 is connected to the connection terminal 10d of the negative electrode bus bar 10n and the terminal 65 of the base plate 60. Since the base plate 60 is connected to the GND side, the GND terminal of the noise removing capacitor 21 can be connected and used as a connection wiring.

The number and size (capacitance) of the noise removing capacitors 21 including the X capacitor 22, the Y capacitor 23, and the like are merely examples, and are appropriately set according to the application, performance, and the like of the power conversion device 1. Also in this case, since the plurality of noise removing capacitors 21 are arranged in a line on the mounting portion 62 of the base plate 60, there is a high degree of freedom in changing the number, size, and the like of the noise removing capacitors 21. Note that the positioning member 30 is not necessarily required, and the noise removing capacitors 21 may be arranged in a line on the mounting portion 62 of the base plate 60 via an insulating member, a heat dissipation member, or the like. In addition, although the example in which the noise removing capacitors 21 are arranged has been described, other types of capacitors may be arranged in a line.

FIG. 9(A) and FIG. 9(B) are perspective views illustrating Modification 1 of the first DC bus bar 10a. FIG. 9(A) illustrates a state before the first DC bus bar 10a is arranged, and FIG. 9(B) illustrates a state after the first DC bus bar 10a is arranged. The same portions as those in FIGS. 7 and 8 are denoted by the same reference numerals, and the description thereof will be omitted.

The first DC bus bar 10a illustrated in FIG. 9(A) is illustrated in a state where an insulating resin member 10m that covers a positive electrode bus bar 10p and a negative electrode bus bar 10n is removed. As illustrated in FIG. 9(A), the positive electrode bus bar 10p and the negative electrode bus bar 10n of the first DC bus bar 10a are provided with bent portions 12p and 12n on the side in surface contact with the inner wall surface of the housing 7. The bent portions 12p and 12n are formed in a longitudinal direction of the positive electrode bus bar 10p and the negative electrode bus bar 10n having a flat plate shape. The bent portions 12p and 12n are provided in a direction orthogonal to an overlapping surface of the overlapped positive electrode bus bar 10p and negative electrode bus bar 10n, respectively, and the bent portion 12p and the bent portion 12n are provided so as to protrude in directions opposite to each other.

FIG. 9(B) is a cross-sectional view of the power conversion device 1 in a state where the first DC bus bar 10a is arranged. Since the bent portions 12p and 12n are formed, the first DC bus bar 10a comes into surface contact with the inner wall surface of the housing 7 via the insulating resin member 10m. A heat dissipation member 13 having thermal conductivity may be arranged between the resin member 10m of the first DC bus bar 10a and the housing 7.

FIG. 10(A) and FIG. 10(B) are perspective views illustrating Modification 2 of the first DC bus bar 10a. FIG. 10(A) illustrates a state before arrangement, and FIG. 10(B) illustrates a state after arrangement. The same portions as those in FIGS. 7 and 8 are denoted by the same reference numerals, and the description thereof will be omitted.

The first DC bus bar 10a illustrated in FIG. 10(A) is illustrated in a state where an insulating resin member 10m covering a positive electrode bus bar 10p and a negative electrode bus bar 10n is removed. As illustrated in FIG. 10(A), the positive electrode bus bar 10p and the negative electrode bus bar 10n of the first DC bus bar 10a are provided with bent portions 12p and 12n on the side in surface contact with an inner wall surface of a housing 7. The bent portions 12p and 12n are formed in a longitudinal direction of the positive electrode bus bar 10p and the negative electrode bus bar 10n having a flat plate shape. The bent portions 12p and 12n are provided in a direction orthogonal to an overlapping surface of the overlapped positive electrode bus bar 10p and negative electrode bus bar 10n, respectively, and the bent portion 12p and the bent portion 12n are provided so as to protrude in the same direction.

FIG. 10(B) is a cross-sectional view of the power conversion device 1 in a state where the first DC bus bar 10a is arranged. Since the bent portions 12p and 12n are formed, the first DC bus bar 10a comes into surface contact with the inner wall surface of the housing 7 via the insulating resin member 10m. A heat dissipation member 13 having thermal conductivity may be arranged between the resin member 10m of the first DC bus bar 10a and the housing 7.

Figure 11:
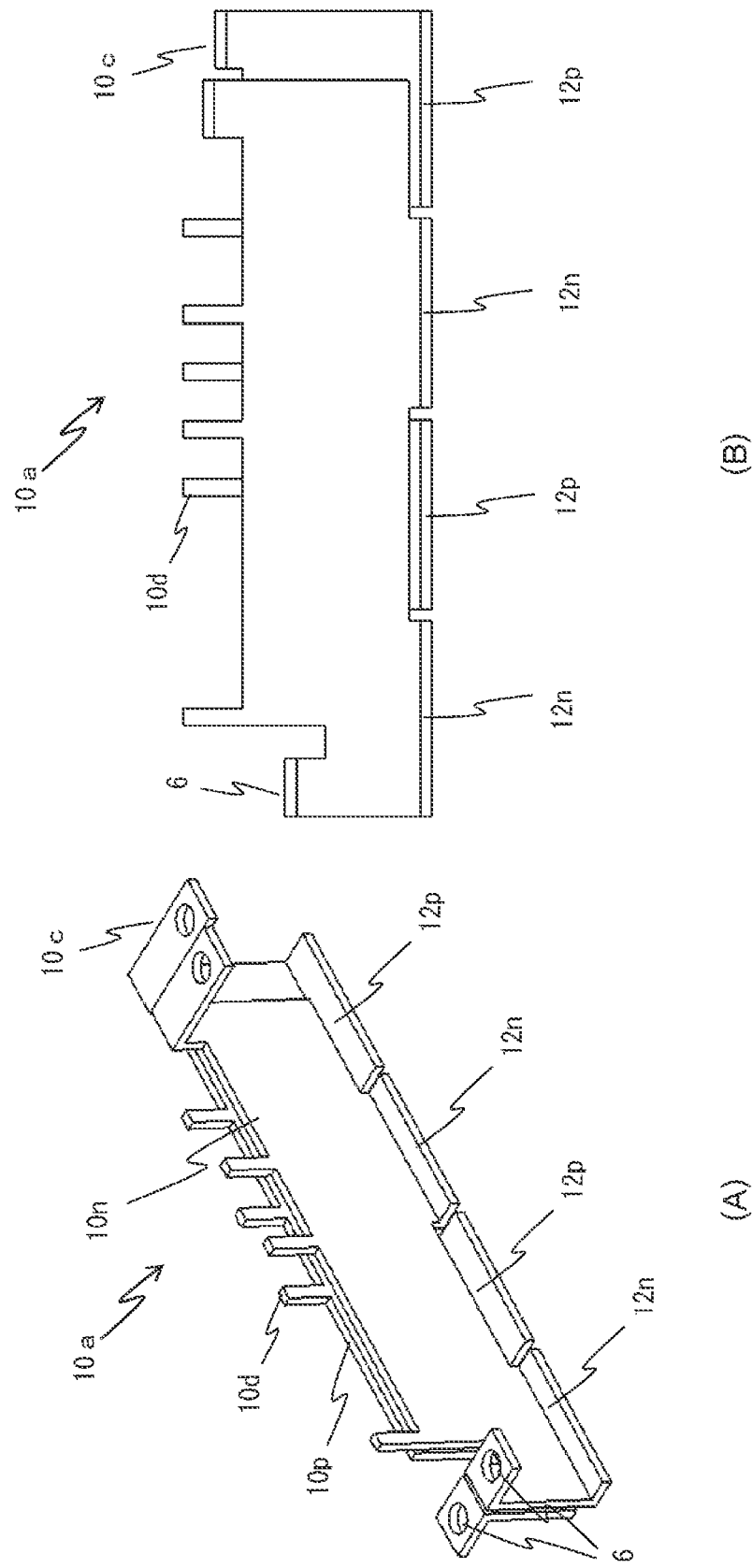
FIG. 11(A) and FIG. 11(B) are perspective views illustrating Modification 3 of the first DC bus bar.

FIG. 11(A) and FIG. 11(B) are views illustrating Modification 3 of the first DC bus bar 10a. FIG. 11(A) is a perspective view, and FIG. 11(B) is a side view. The same portions as those in FIG. 8 are denoted by the same reference numerals, and the description thereof will be omitted.

The first DC bus bar 10a illustrated in FIG. 11(A) and FIG. 11(B) is illustrated in a state where an insulating resin member 10m that covers a positive electrode bus bar 10p and a negative electrode bus bar 10n is removed. As illustrated in FIG. 11(A) and FIG. 11(B), the positive electrode bus bar 10p and the negative electrode bus bar 10n of the first DC bus bar 10a are provided with bent portions 12p and 12n on the side in surface contact with an inner wall surface of a housing 7. The bent portions 12p and 12n are provided in a direction orthogonal to an overlapping surface of the overlapped positive electrode bus bar 10p and negative electrode bus bar 10n, respectively, and the bent portion 12p and the bent portion 12n are provided so as to protrude in the same direction. The bent portions 12p and 12n are alternately formed with a predetermined length in the longitudinal direction of the positive electrode bus bar 10p and the negative electrode bus bar 10n having a flat plate shape.

FIG. 12(A) and FIG. 12(B) are views illustrating Modification 4 of the power conversion device 1. FIG. 12(A) is a perspective view, and FIG. 12(B) is a cross-sectional view. The same portions as those in FIGS. 7 and 8 are denoted by the same reference numerals, and the description thereof will be omitted.

As illustrated in FIG. 12(A) and FIG. 12(B), on an inner wall surface of a housing 7 to which a first DC bus bar 10a is fixed, a screen 14 surrounding a positive electrode bus bar 10p and a negative electrode bus bar 10n of the first DC bus bar 10a is provided. The screen 14 protrudes from the inner wall surface of the housing 7 at a predetermined height along a resin member 10m of the first DC bus bar 10a. A heat dissipation member 13 having thermal conductivity may be arranged between the resin member 10m of the first DC bus bar 10a and the screen 14.

By adopting the configurations illustrated in Modification 1 to Modification 4, the thermal resistance Rth1 can be reduced from the positive electrode bus bar 10p and the negative electrode bus bar 10n of the first DC bus bar 10a to the refrigerant passage 72, and the cooling effect of the first DC bus bar 10a can be enhanced. Furthermore, the difference between the thermal resistance Rth1 and the above-described thermal resistance Rth2 up to the noise removing capacitor 21 can be made larger, and the effect of suppressing the temperature rise ΔTcap flowing into the noise removing capacitor 21 is enhanced.

According to the embodiment described above, the following operational effects can be obtained.

(1) A power conversion device 1 includes: a power conversion circuit 3 that converts DC power into AC power; a positive electrode bus bar 10p and a negative electrode bus bar 10n connected to the power conversion circuit 3; a capacitor 21 connected to at least one of the positive electrode bus bar 10p and the negative electrode bus bar 10n; a base plate 60 made of metal on which the capacitor 21 is placed; and a housing 7 in which the power conversion circuit 3, the capacitor 21, the base plate 60, the positive electrode bus bar 10p, and the negative electrode bus bar 10n are accommodated, and a refrigerant passage 72 is formed, in which the positive electrode bus bar 10p and the negative electrode bus bar 10n are installed in the housing 7 via an insulating resin member 10m, and in which the base plate 60 on which the capacitor 21 is placed is installed in the housing 7, and a thermal resistance Rth2 from the capacitor 21 to the refrigerant passage 72 is larger than a thermal resistance Rth1 from the positive electrode bus bar 10p and the negative electrode bus bar 10n to the refrigerant passage 72. As a result, the capacitor is less likely to be affected by heat generated by the bus bar.

The present invention is not limited to the above-described embodiment, and other forms conceivable within the scope of the technical idea of the present invention are also included within the scope of the present invention as long as the features of the present invention are not impaired. In addition, the above-described embodiment and a plurality of modifications may be combined.

REFERENCE SIGNS LIST 1 power conversion device
2 high-voltage battery
3 power conversion circuit
4 power semiconductor circuit unit
4a, 4b, 4c power semiconductor module
6 DC power supply terminal
7 housing
10 DC bus bar
10a first DC bus bar
10b second DC bus bar
10p positive electrode bus bar
10n negative electrode bus bar
10m resin member
10c connection portion
10e, 10f connection region
12p, 12n bent portion
12a, 12b, 12c AC bus bar
13 heat dissipation member
14 screen
20 filter circuit unit
21 noise removing capacitor
22 X capacitor
23, 24 Y capacitor
30 positioning member
31 elastic locking member
32 holding member
50 smoothing capacitor
60 base plate
62 mounting portion
63 wall portion
64, 71 convex portion
70 circuit board
72 refrigerant passage
MG motor generator
Cg stray capacitance
Ig noise current
Rth1, Rth2, Rth3, Rth4 thermal resistance

The invention claimed is:

1. A power conversion device comprising:
a power conversion circuit that converts DC power into AC power;
a positive electrode bus bar and a negative electrode bus bar connected to the power conversion circuit;
a capacitor connected to at least one of the positive electrode bus bar and the negative electrode bus bar;
a base plate made of metal on which the capacitor is placed; and
a housing in which the power conversion circuit, the capacitor, the base plate, the positive electrode bus bar, and the negative electrode bus bar are accommodated, and a refrigerant passage is formed,
wherein the positive electrode bus bar and the negative electrode bus bar are installed in the housing via an insulating resin member, and
the base plate on which the capacitor is placed is installed in the housing, and a thermal resistance from the capacitor to the refrigerant passage is larger than a thermal resistance from the positive electrode bus bar and the negative electrode bus bar to the refrigerant passage.

2. The power conversion device according to claim 1, wherein the housing includes a convex portion protruding toward the base plate, and the base plate is installed in the housing by a fixing portion fixed on a top surface of the convex portion.

3. The power conversion device according to claim 2, wherein the capacitor is a noise removing capacitor, and the base plate includes a mounting portion on which the noise removing capacitor is mounted, and the mounting portion is formed at a height different from a height of the fixing portion.

4. The power conversion device according to claim 3, comprising a smoothing capacitor that is connected to the positive electrode bus bar and the negative electrode bus bar and smooths a DC voltage between the positive electrode bus bar and the negative electrode bus bar, wherein each of the positive electrode bus bar and the negative electrode bus bar has a connection region connected to the smoothing capacitor, and the connection region is arranged between the base plate and the housing.

5. The power conversion device according to claim 4, wherein the base plate forms a wall portion between the connection region and the mounting portion.

6. The power conversion device according to claim 4, comprising a circuit board on which an electronic component is mounted, wherein the circuit board is arranged to face a surface of the base plate opposite to a surface facing the connection region.

7. The power conversion device according to claim 3, wherein the noise removing capacitor includes a plurality of noise removing capacitors, and the plurality of noise removing capacitors are arranged in a line on the mounting portion.

8. The power conversion device according to claim 3, wherein one terminal of the noise removing capacitor is connected to the positive electrode bus bar or the negative electrode bus bar, and the other terminal of the noise removing capacitor is connected to the base plate.

9. The power conversion device according to claim 8, wherein the noise removing capacitor is fixed to the mounting portion of the base plate via a positioning member having insulating property.

10. The power conversion device according to claim 1, wherein the positive electrode bus bar and the negative electrode bus bar include a bent portion on a side in surface contact with an inner wall surface of the housing via the resin member.

11. The power conversion device according to claim 1, comprising a screen surrounding the positive electrode bus bar and the negative electrode bus bar on an inner wall surface of the housing.

* * * * *